UNITED STATES PATENT OFFICE.

JULIUS WEZEL, OF REUDNITZ, NEAR LEIPSIC, GERMANY.

ARTIFICIAL LITHOGRAPHIC STONE.

SPECIFICATION forming part of Letters Patent No. 333,801, dated January 5, 1886.

Application filed March 23, 1885. Serial No. 159,829. (No specimens.)

*To all whom it may concern:*

Be it known that I, JULIUS WEZEL, of Reudnitz, near Leipsic, Germany, have invented a new and Improved Artificial Lithographic Stone, of which the following specification is a full, clear, and exact description.

This invention relates to an improved compound for coating metal plates, to be used in place of carbonate of lime, heretofore generally used. Metal plates to which my compound is applied have the same essential properties as lithographic stones, and are more convenient in use.

The invention consists in a metal plate coated with a mixture of lime salt of fatty or resinous acid and sulphate of lime.

In carrying out my invention I proceed as follows: Lithographic stone, chalk, marble, or lime is dissolved by means of sulphuric acid and hydrochloric acid. From this solution lime salt of fatty or resinous acid is separated by means of oil-soap or a resinous soap. The excess of acid is then removed by filtration, and the resultant mass is dried and will form a powder. This powder is composed of lime salt of fatty or resinous acid and sulphate of lime, and is mixed with a weak solution of soda. It is then thrown upon the heated metal plates by means of an injector, or in other suitable manner.

I claim as my invention—

An artificial lithographic stone consisting of a metal plate coated with a mixture of lime salt of fatty or resinous acid and sulphate of lime, substantially as specified.

In testimony whereof I have signed my name to this specification in the presence of two subscribing witnesses.

JULIUS WEZEL.

Witnesses:
EDMUND BACH,
HEINRICH LUSKE.